United States Patent [19]

Mrenna et al.

[11] Patent Number: 5,279,487
[45] Date of Patent: Jan. 18, 1994

[54] BOLT-ON, DUPLEX CIRCUIT BREAKER REJECTION ASSEMBLY

[75] Inventors: Stephen A. Mrenna; Melvin A. Carrodus, both of Brighton Twp., Beaver County, Pa.

[73] Assignee: Westinghouse Electric Corp., Pittsburgh, Pa.

[21] Appl. No.: 853,567

[22] Filed: Mar. 18, 1992

[51] Int. Cl.$^5$ .............................................. H02B 1/04
[52] U.S. Cl. .................................. 248/220.2; 200/294; 361/635; 361/652
[58] Field of Search .................... 248/220.2, 223.3; 200/293, 294, 51 R; 361/353, 354, 355, 358, 361, 363

[56] References Cited

U.S. PATENT DOCUMENTS

| | | | |
|---|---|---|---|
| 3,120,629 | 2/1964 | Davis | 361/354 |
| 3,146,379 | 8/1964 | Giger, Jr. | 361/354 |
| 3,229,166 | 1/1966 | Edmunds | 361/354 |
| 3,325,693 | 6/1967 | Stanback | 361/354 |
| 3,403,299 | 9/1968 | Mrowka et al. | 361/353 |
| 4,351,620 | 9/1982 | Stritt et al. | 200/294 X |
| 4,557,047 | 12/1985 | Sadoques | 361/353 X |
| 4,825,338 | 4/1989 | Hubbard et al. | 361/353 X |
| 5,047,604 | 9/1991 | Grass et al. | 200/294 |

OTHER PUBLICATIONS

Westinghouse Electric Corporation, Brochure on "Load Centers".
Westinghouse Electric Corporation, Brochure on "Circuit Protective Devices".
U.L. Requirements—Oct. 12, 1988, Sections 12.12–12.31 of U.L. 67 "Panelboards".

Primary Examiner—David A. Scherbel
Assistant Examiner—Derek J. Berger
Attorney, Agent, or Firm—Gary R. Jarosik

[57] ABSTRACT

A bolt-on, duplex circuit breaker having an external, integrally formed key member designed with a truncated pyramidal shape. The pyramidal shape is used to discourage tampering aimed at its removal. A panelboard into which bolt-on, duplex circuit breakers are mounted having mounting rails onto which the circuit breakers are disposed. The mounting rails have cooperating, key member accepting notches that act in conjunction with the key member integrally formed upon the circuit breaker for limiting the number of bolt-on, duplex circuit breakers that are insertable within the panelboard.

16 Claims, 3 Drawing Sheets

BOLT-ON, DUPLEX CIRCUIT BREAKER REJECTION ASSEMBLY

BACKGROUND OF THE INVENTION

This invention relates to bolt-on, duplex circuit breakers, and more particularly to an assembly which includes the bolt-on circuit breaker and the panelboard into which it is inserted.

For many years, plug-in, duplex circuit breakers have been manufactured for use within electrical panelboards. These plug-in breakers have typically been manufactured to fulfill the Underwriter Laboratories Inc. standard UL67, "Standard for Panelboards", Guide No. 320 BO File E31679 and E52977, so as to entitle these breakers to UL approval. UL67 states that these breakers and the panelboard into which they are fitted must be manufactured so as to permit installation of no more breaker units than that for which the panelboard was intended. UL67 further states that installation of more breaker units than intended within the panelboard is considered capable of being accomplished if it is possible to force a breaker unit, without deliberate modification of either the unit or the panelboard, into position in a space not intended to receive it or if it is possible to modify the breaker unit using specifically described tools (i.e. electrician's tools) to permit mounting the unit within the panelboard. To fall within these guidelines, plug-in breakers have been manufactured with a well known rejection feature.

The rejection feature employed by plug-in, duplex circuit breakers is designed around the plug-in construction of the device. The line terminal of plug-in breakers is manufactured with internal spring clips while the panelboard line bus is manufactured with stabs. When a breaker is mounted within the panelboard, the line side spring clip engages the line bus stab thereby securing the breaker within the panelboard and completing the electrical connection. To fulfill the requirements of UL67, the plug-in breaker is manufactured with a rejection tab positioned within the insulating casing of the breaker extending along the line terminal spring clips while the line bus stabs are manufactured with a correspondingly notched vertical groove. This tab-notch combination allows the breaker to be plugged only onto those stabs that are manufactured specifically to accept the breaker. The location of the rejection tab internally within the breaker further fulfills the unmodifiable requirement of UL67.

The need for a better means of securing a breaker within a panelboard and for better electrical connections gave rise to the invention of the bolt-on, duplex circuit breaker. The bolt-on breaker is manufactured by replacing the internal line terminal spring clips with an external mounting flange having a centrally disposed opening, while the line bus stabs are replaced with bolting assemblies to which the breaker flange is bolted. While this accomplishes the desired results, the rejection feature employed by the plug-in breakers can not be utilized with this design. As a result, bolt-on breakers have the problem of not being able to meet the safety requirements imposed by UL67.

SUMMARY OF THE INVENTION

This invention proposes a solution to the problem of having bolt-on, duplex circuit breakers that do not meet UL67 requirements. The solution requires that the bolt-on breaker have molded to its exterior a key member. Correspondingly, the panelboard has its mounting rail notched in those locations where the bolt-on, duplex circuit breaker is to be mounted. The cooperation of the exterior key member and the notches on the mounting rail of the panelboard permit the insertion of a fixed number of bolt-on, duplex circuit breakers within the panelboard. Furthermore, the breakers key member is manufactured with a truncated pyramidal shape. This sloping shape discourages modification aimed at the removal of the key member through the use of typical electrician's tools.

BRIEF DESCRIPTION OF THE DRAWINGS

For a better understanding of the invention, reference may be had to the preferred embodiment shown in the following drawings in which.

DESCRIPTION OF THE PREFERRED EMBODIMENT

Figure 1:
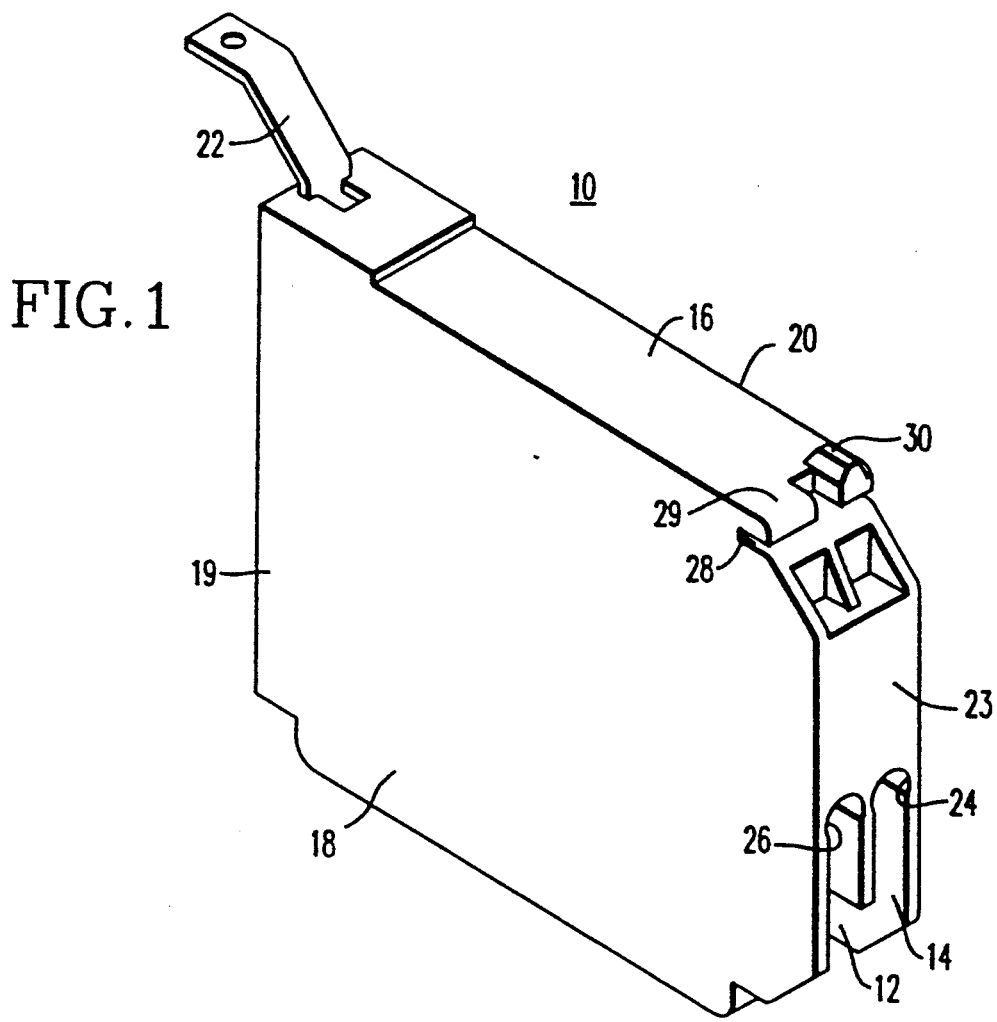
FIG. 1 shows an orthogonal view from the bottom of a duplex bolt-on circuit breaker embodying the present invention.

Referring now to the drawings and FIG. 1 in particular, a duplex bolt-on circuit breaker 10 embodying the teachings of the present invention is shown. In particular, the circuit breaker 10 comprises two side-by-side mounted simplex circuit breakers 12 and 14. For a better understanding of a simplex circuit breaker, reference may be had to U.S. Pat. No. 4,266,210 entitled "Circuit Breaker With Improved Arc Extinguishing Means" issued May 5, 1991 which is incorporated by reference herein.

For purposes of the present invention, circuit breaker 10 comprises an insulating housing 16 having sides 18 and 20 and a bolt-on support terminal 22 connectable to the line side of a circuit to be protected. There are provided duplex terminals 24 and 26 for connection to the load side of the circuit or circuits to be protected. The front 23 of the circuit breaker 10 has a notch 28 disposed therein for receiving the tang of a mounting member to be described in more detail hereinafter. There is provided on the bottom, load side foot pad 29 of the circuit breaker, and associated most closely with side 20, a pyramidal key member 30 which is adapted to be accepted by a complementary notch in a mounting rail in a manner to be described in more detail hereinafter.

Figure 2:
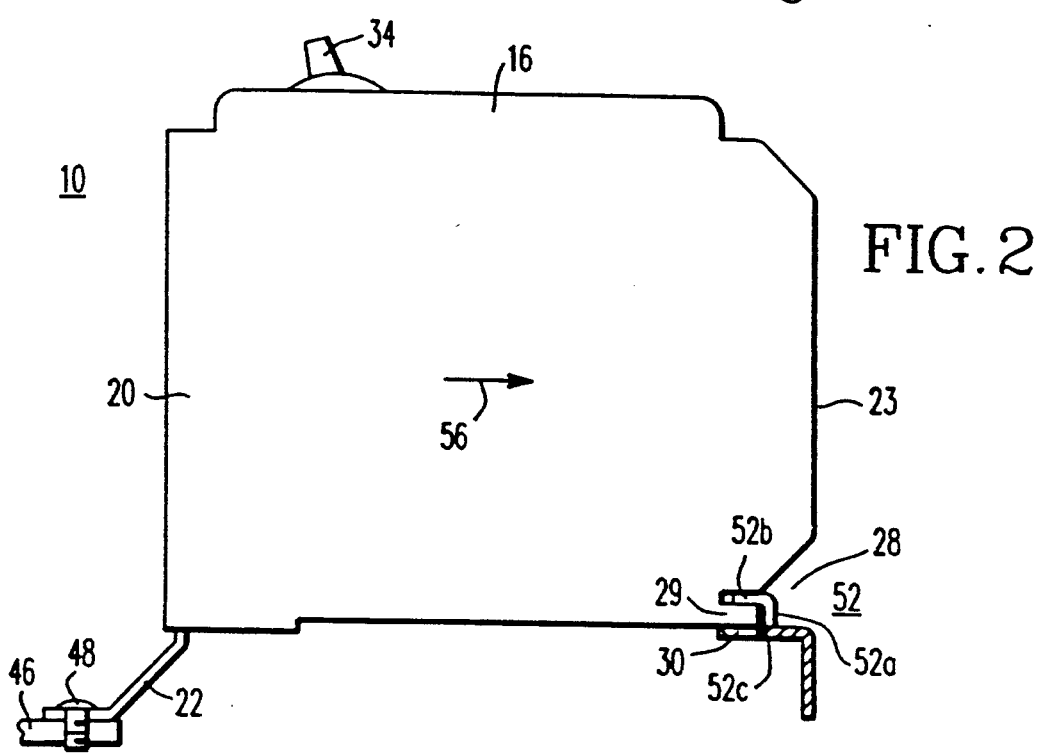
FIG. 2 shows a side elevation of the circuit breaker of FIG. 1.

Referring now to FIG. 2, a side elevation of the duplex circuit breaker 10 is depicted. In particular, the arrangement of the notch 28 oriented with respect to the side 20 and the front 23 is depicted. In addition, the foot pad 29 is also shown. Keying member 30, shown projecting downwardly from the circuit breaker insulating casing 16 at the foot pad 29, will be nestled appropriately in a notch in a mounting rail in a manner to be described in greater detail hereinafter.

Figure 3:
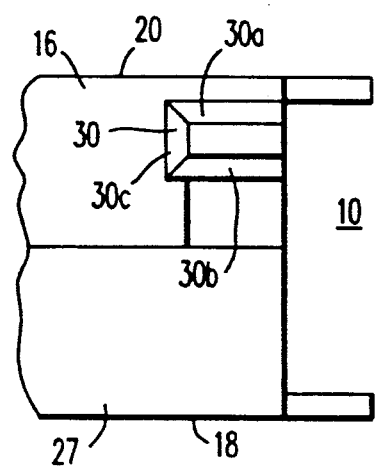
FIG. 3 shows a partially broken away bottom plan view of the circuit breaker of FIGS. 1 and 2.

Referring now to FIG. 3, a partially broken away bottom portion of the circuit breaker 10 is shown. In particular, the insulating casing 16 shows the keying member 30 projecting downwardly from the bottom portion 27 of the circuit breaker 10. The keying member 30 is disposed closer to the side 20 than the side 18.

Figure 4:
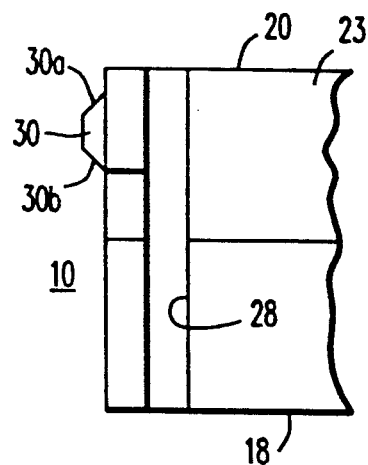
FIG. 4 is a partially broken away front elevation of the circuit breakers of FIGS. 1-3.

Referring now to FIG. 4, a different orientation of the circuit breaker apparatus 10 is shown in which the notch 28 and its orientation with respect to the keying member 30 is once again depicted on the front portion 23 of the circuit breaker 10. The relative disposition of the sides 18 and 20 with respect to the member 30 is depicted clearly in FIG. 4.

Figure 5:
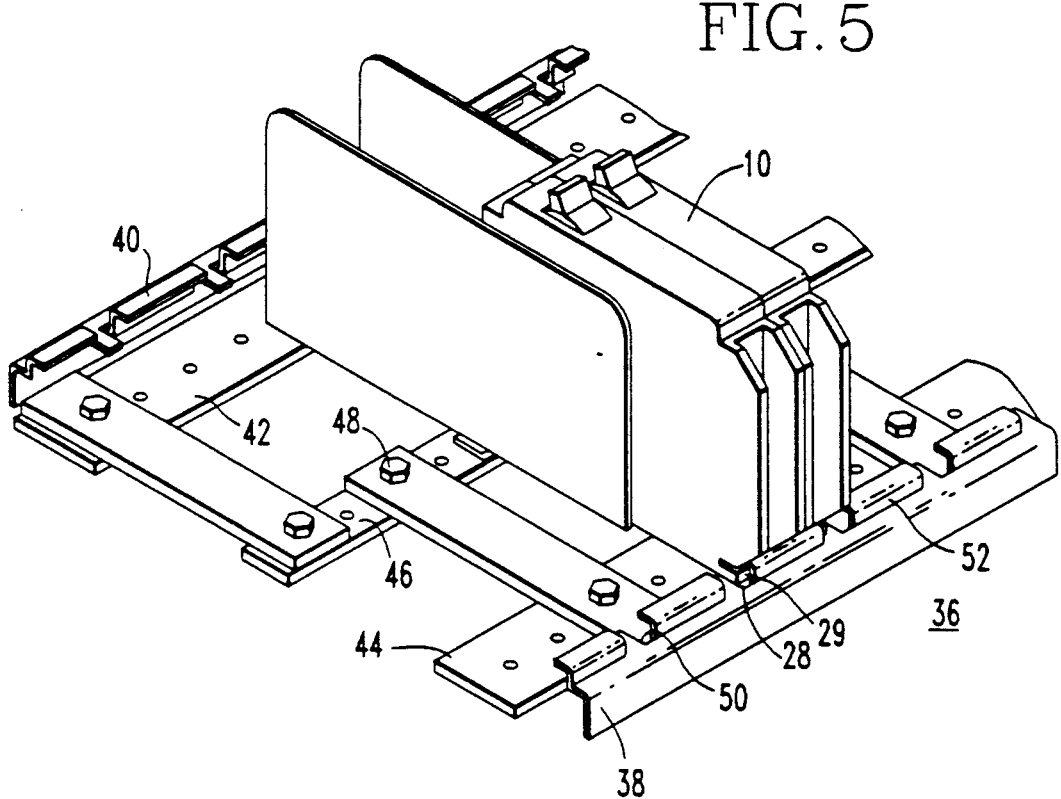
FIG. 5 is an orthogonal view of the duplex circuit breaker of FIGS. 1-4 disposed in a mounting pan utilizing the features of the present invention.

Referring now to FIG. 5, the circuit breaker 10 is shown installed in a mounting pan assembly 36. Mounting pan assembly 36 comprises complementary mounting rails 38 and 40 and complementary support bars 42 and 44 and a conducting rail 46.

Referring to FIG. 5 and FIG. 2, the arrangement of the circuit breaker 10 on the mounting rail 38 and the conductor 46 is depicted in greater detail. In particular, rail 38 includes notched portions 50 with associated securing members 52 which form an integral part of the rail 38. Securing member 52 includes a vertical 10 portion 52a and a horizontal portion 52b. Horizontal portion 52b is complementary to and thus fits snugly within the previously described notch 28 in the front portion 23 of the circuit breaker 10. Foot pad 29 rests on a portion 52c of mounting rail 38. In the mounting process, the circuit breaker 10 is inserted in the direction 56 as shown in FIG. 2 so that the tang or horizontal member 52b of member 52 is snugly captured by the notch or opening 28 so that portions of the bottom part of the circuit breaker are trapped between portion 52c of member 52 and the horizontal tang 52b. Furthermore, motion to the right as viewed in FIG. 2 along the direction 56 is prevented by the displacement of the horizontal member 52 against the extreme portion of the notch 28. The securing operation is completed by placing combination terminal and support member 22 against conducting rail 46 to which it is securely bolted by way of bolt member 48.

Figure 6:
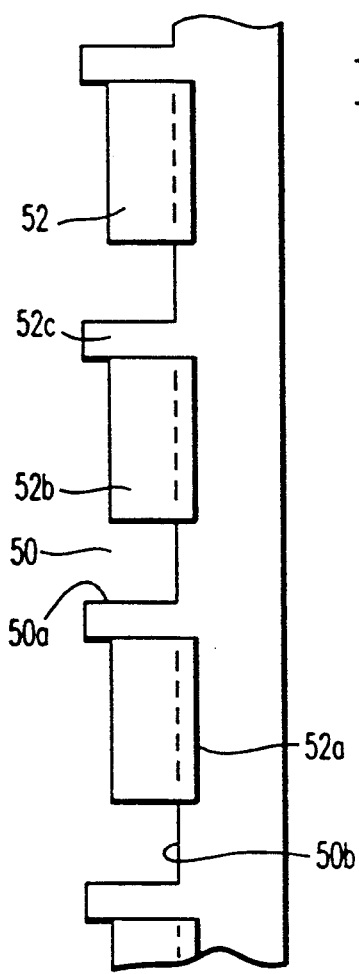
FIG. 6 is a top plan view, partially broken away, of the mounting rail shown in FIG. 5.

Referring now to FIG. 6, a top view of the rail 38 of FIG. 5 is depicted. In particular, member 52 is shown overlapping notch section 50 as viewed from the top. The support portion 52c for the foot pad 29 on the bottom of the circuit breaker 10 is clearly shown as well as vertical portion 52a and horizontal portion 52b. In a preferred embodiment of the invention, the keying member 30 is captured between side wall 50a of notch 50 and front wall 50b thereof.

Figure 7:
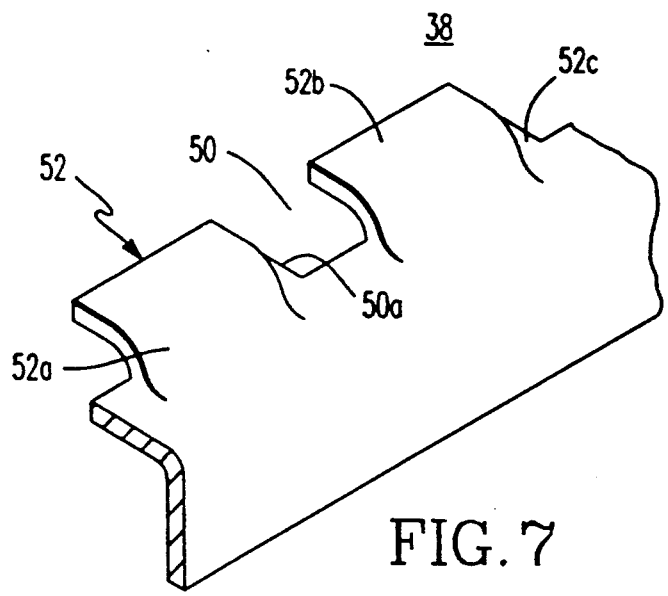
FIG. 7 is an orthogonal view of a portion of the mounting rail of FIG. 6.

Referring now to FIG. 7, an orthogonal view of the rail arrangement of FIG. 6 is shown. In particular, the relative arrangement of the notch 50 and the securing member 52 is shown.

Referring to FIGS. 2–4, 6 and 7 in particular, the operation of the present invention is described hereinafter. In particular, the circuit breaker 10 is made in each case having a member 30 on the bottom thereof. All rails 38 which are to accommodate the circuit breaker 10 have the notches 50 disposed therein. Notches 50 are not disposed in rails which are not meant to accommodate circuit breaker 10. Consequently when an attempt is made to insert a circuit breaker 10 into a mounting pan assembly 36 having a rail other than 38 the presence of the key member 30 on circuit breaker 10 and the lack of a notch 50 will prevent the circuit breaker 10 from being inserted into, and thus utilized, with that arrangement. However, if the notch 50 is present, it will accept the key member 30 thus indicating that the circuit breaker is usable with the mounting pan assembly 36.

Referring now in particular to FIGS. 3 and 4, the geometric construction of the key member 30 is emphasized. In particular, in this embodiment of the invention, the key member 30 is a truncated four-sided pyramid. The pyramid may have one vertical side and three angularly disposed sides. In other embodiments of the invention, the pyramid may have four slanted angular sides. Furthermore, in another embodiment of the invention, the pyramid need not be truncated. Still further, any other appropriate keying shape utilizable with a notch such as 50 may be employed on the bottom of the circuit breaker 10 provided it performs the function of allowing rejection of the circuit breaker 10 if the rail arrangement 38 is inappropriate as is indicative of a mounting pan assembly 36 which is not meant to accommodate the duplex circuit breaker 10.

In the embodiment of the invention shown in FIGS. 3 and 4, the sides 30a, 30b and 30c are deliberately slanted or disposed at an oblique angle so that the keying member 30 may not be severed from the foot pad 29 of the insulating house 16 of the circuit breaker 10. An attempt to sever or remove the member 30 through the use of standard electrician's tools will be deterred by the angular side surfaces 30a, 30b and 30c, thus rendering the keying arrangement relatively fail safe and tamper proof.

Figure 8:
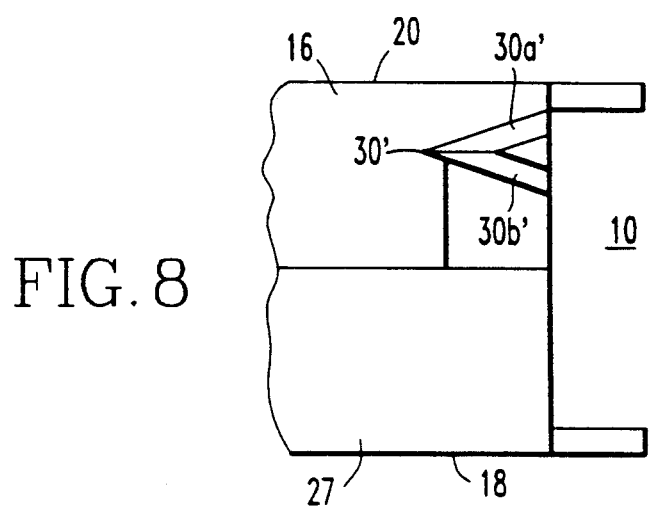
FIG. 8 shows a partially broken away bottom plan view of an alternative embodiment of the present invention.

In an alternate embodiment, shown in FIG. 8, the key member 30' consists of a triangular pyramid having a vertical side and a pair of angular side surfaces 30a' and 30b'. It is contemplated that this embodiment need not be truncated as is shown. Again, the angular side surfaces 20a' and 30b' render the key member 30' relatively tamper proof.

The circuit breaker 10 of the present invention may include, in addition to the circuit breaker, the mounting pan 36. Mounting pan 36 has an accepting region which is adapted to accept the key member 30 of a predetermined shape. The key member shape is utilized for cooperating with the accepting region 50 for allowing only predetermined circuit breakers to be disposed in the mounting pan 36. The rail assembly accepting means may be a notch 50 of predetermined shape such as shown in FIGS. 5, 6 and 7. The key member 30 insertable in the notch 50 may be otherwise identified as a shaped tab. It is envisioned in the preferred embodiment of the invention that the key member 30 is integrally formed with the foot pad 29 of the insulting housing 16 of the circuit breaker 10 so that it cannot be easily removed for reasons described previously.

It is to be understood that the description and drawings shown with respect to the present invention are not limiting and that other shaped key members 30 and accepting regions 50 may be utilized provided they meet the standards set forth previously for rejecting an undesirable circuit breaker from a mounting pan assembly 36.

The present invention has many advantages. One advantage lies in the fact that only circuit breakers which are appropriate for utilization with mounting panels designed specifically for their use and only for their use may be utilized.

We claim:

1. A circuit breaker assembly, comprising:

mounting means for having a predetermined circuit breaker means disposed thereon;

accepting means having a predetermined shape on said mounting means for allowing said predetermined circuit breaker means to be disposed only thereon; and predetermined circuit breaker means having a housing and at least two electrical terminals on said mounting means wherein said housing has a key member having a pyramidal shape disposed thereon for cooperating with said accepting means for allowing said predetermined circuit breaker means to be disposed only on said mounting means.

2. The circuit breaker assembly as recited in claim 1, wherein said pyramidal shape comprises a rectangular pyramid.

3. The circuit breaker assembly as recited in claim 1, wherein said pyramidal shape comprises a triangular pyramid.

4. The circuit breaker assembly as recited in claim 1, wherein said pyramidal shape comprises a truncated rectangular pyramid.

5. The circuit breaker assembly as recited in claim 1, wherein said pyramidal shape comprises a truncated triangular pyramid.

6. The circuit breaker assembly as recited in claim 1, wherein said accepting means comprises a rail assembly on which said predetermined circuit breaker means is disposed, said rail assembly having a notch of a predetermined shape for accepting said key member.

7. The circuit breaker assembly as recited in claim 6, wherein said pyramidal shape comprises a rectangular pyramid.

8. The circuit breaker assembly as recited in claim 7, wherein said accepting means further comprises a rectangular notch.

9. The circuit breaker assembly as recited in claim 8, wherein said key member comprises said predetermined circuit breaker means having an insulating shell with said insulating shell having integrally disposed thereon said key member.

10. The circuit breaker assembly as recited in claim 6, wherein said pyramidal shape comprises a truncated rectangular pyramid.

11. The circuit breaker assembly as recited in claim 1, wherein said predetermined circuit breaker means comprises a bolt-on circuit breaker.

12. A circuit breaker, comprising:

predetermined circuit breaker means; and said predetermined circuit breaker means having a housing and at least two electrical terminals wherein said housing has disposed thereon a key member having a pyramidal shape for cooperating with a corresponding notch located on a mounting means for allowing said predetermined circuit breaker means to be mounted only on said mounting means.

13. The circuit breaker assembly as recited in claim 12, wherein said pyramidal shape comprises a rectangular pyramid.

14. The circuit breaker assembly as recited in claim 12, wherein said pyramidal shape comprises a truncated rectangular pyramid.

15. The circuit breaker assembly as recited in claim 12, wherein said key member comprises said predetermined circuit breaker means having an insulating shell with said insulating shell having integrally disposed thereon said key member.

16. Circuit breaker assembly as recited in claim 15, wherein said predetermined circuit breaker means comprises a bolt-on, duplex circuit breaker.

* * * * *